Patented Aug. 18, 1931

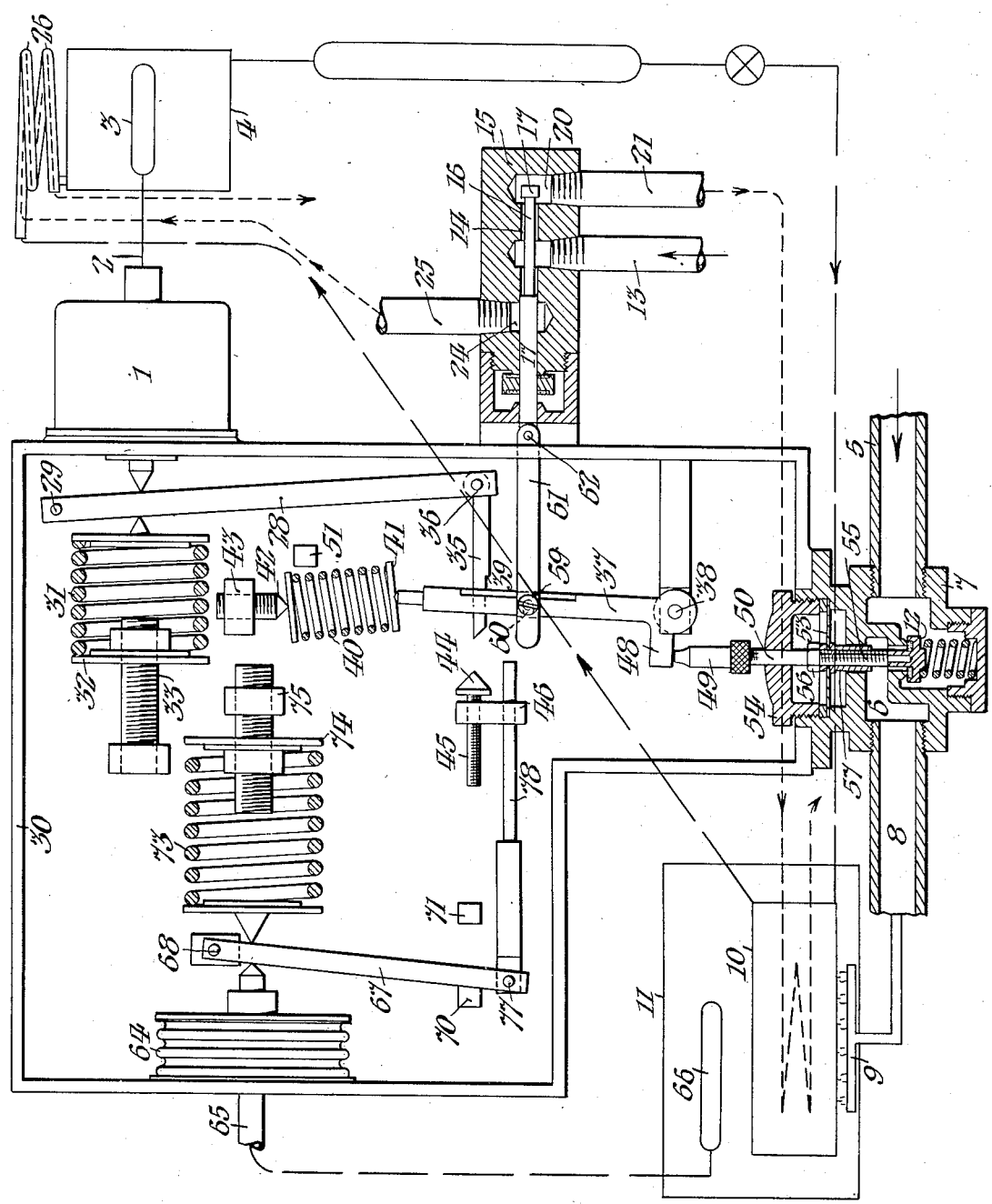

1,819,993

UNITED STATES PATENT OFFICE

JOSEPH WILLIAM WINTER, OF PENFIELD, PENNSYLVANIA, ASSIGNOR TO JOHN WOOD MANUFACTURING COMPANY, OF CONSHOHOCKEN, PENNSYLVANIA, A CORPORATION OF PENNSYLVANIA

THERMOSTATICALLY OPERATIVE VALVE

Original application filed January 23, 1929, Serial No. 334,382. Divided and this application filed November 23, 1929. Serial No. 409,196.

My invention was designed for inclusion in refrigerating apparatus of the automatically operative absorption type, of the general character claimed in my copending application Serial No. 319,051 filed November 13, 1928, for Letters Patent of the United States, and particularly to means for automatically thermostatically controlling the operation of such apparatus.

This is a division of my application Serial No. 334,382 filed January 23, 1929 for Letters Patent of the United States for improvement in such refrigerating apparatus.

Such absorption apparatus includes a gas generator wherein a refrigerant, such as an aqueous solution of ammonia or similar liquefiable fluid, is intermittently heated to generate ammonia gas from the solution, and cooled, conveniently by a stream of water, to permit the residual solvent to reabsorb said gas; a condenser to which said gas is conducted from said generator, and in which it is condensed while heat is absorbed therefrom, conveniently by a stream of water; an an evaporator to which the condensed refrigerant is conducted, and which is located in the refrigerator inclosure which is to be cooled and from which heat is absorbed by the refrigerant during its expansion to a gaseous state, by such heat. The refrigerant gas from said evaporator is conducted back to the generator, in which it is reabsorbed by the residual water, which has been cooled, and from which it is regenerated by heating said generator, to again pass thru the cycle of changes aforesaid.

My invention is particularly applicable to such apparatus wherein the source of heat is a gas burner, and includes automatically operative means for opening and closing valves controlling both the supply of fuel gas to the burner and the supply of cooling water to the condenser and generator, so as to automatically control the operation of the apparatus.

In the form of my invention hereinafter described, a single thermostat is operative, thru my improved control mechanism, to actuate a two-way valve to alternately supply cooling water to the generator and to the condenser, and to coordinately operate a fuel gas valve; so that the gas is supplied to heat the generator when the water is supplied to cool the condenser in which the refrigerant products of evaporation from the generator are condensed, and, contemporaneously shut off the supply of water to the condenser, turn on the supply of water to cool the generator, and diminish the supply of fuel gas to the generator, leaving only a pilot light for resumption of the refrigerant generating operation when the full volume of fuel gas is again supplied to heat the generator.

However, it is to be understood that the invention herein claimed is not limited to embodiment in refrigerating apparatus but is of general use to automatically effect the snap action of a valve and, in its more complex form, to coordinately control the passage of two different fluids, as hereinafter described.

My invention includes the various novel features of construction and arrangement hereinafter more definitely specified.

Said drawing is a diagrammatic representation of a convenient embodiment of the essential elements of my improved valve controlling apparatus.

In said drawing; 1 indicates a sylphon bellows containing a thermostatic liquid, so arranged as to be expanded and contracted in accordance with the temperature of some space which is to be cooled. For instance, the fluid in said thermostat 1 may be connected by the conduit 2 with the fluid containing bulb 3 in the chamber 4 of the refrigerant evaporator included in the refrigerating system to be controlled.

In such embodiment, the function and effect of said thermostat 1 is to control the supply of fuel gas and cooling water in accordance with the changes in temperature in said chamber 4. Fuel gas is supplied from the conduit 5 thru the valve port 6, in the valve casing 7, and thru the conduit 8 to the burner 9 beneath the generator 10 in the combustion chamber 11. In the position of the apparatus shown in the drawing, said valve port 6 is closed by the puppet valve 12.

Cooling water is supplied from the conduit 13 thru the passage 14 in the two-way valve casing 15 around the reduced portion 16 of the slide valve 17 which is mounted to reciprocate in said casing. Said water flows from said passage 14 thru the port 20 and conduit 21 to cool the refrigerant solution contents of said generator 10.

Said valves 12 and 17 remain in the position shown during the absorption period of the apparatus, i. e., while the liquid contents of the generator 10 are being cooled so as to absorb the fluid refrigerant previously evaporated therefrom by the maximum operation of said burner 9. During that period, the atmosphere in the chamber 4 gradually rises in temperature by absorption of heat from the contents of the refrigerator until a critical temperature is reached, at which said thermostat 1 operates to contemporaneously open said fuel valve 12 to heat the contents of the generator to re-discharge therefrom the refrigerant which has been absorbed therein during such absorption period, and, contemporaneously shift said slide valve 17 to shut off the supply of cooling water from the conduit 13 thru said pipe 21 by closure of said passage 14 at the right hand end thereof by the end portion of said valve 17 which is of full diameter. Such movement of said valve 17 contemporaneously opens communication from said cooling water supply pipe 13 thru said passage 14, and the port 24 in said casing 15 and the conduit 25 to supply cooling water to the condenser 26. Said valves 12 and 17 remain in the position last above described during the generating period of operation of the refrigerating apparatus, i. e., while the fluid refrigerant is being driven off from the solution in the generator by the heat from the burner 9 and is passing thru the condenser in which it is again reduced to the liquid state and from which it is delivered into the evaporator.

In order to effect the above described coordinate operation of said valves 12 and 17, I find it convenient to connect said thermostat 1 with said valves by the means including the lever 28 which is fulcrumed at 29 in the casing 30, and is continually thrust to the right by the spring 31 which is supported at its opposite end by the abutment 32 which is conveniently formed as a nut axially adjustable on the stationary screw stud 33. Said spring 31 is thus adjustable to variably determine the pressure at which it will yield to permit said lever 28 to be swung to the left. Of course, as the pressure of expansion of the fluid in the thermostat 1 is determined by the temperature in the chamber 4, the adjustment of said abutment 32 determines the temperature at which said lever 28 is thus shifted.

Said lever 28 has the latch 35 connected by the pivot 36 at the lower end thereof and adapted to slide thru a slot in the bell crank lever 37 which is fulcrumed at 38 in said casing 30. Said latch has the shoulder 39 adapted to encounter said lever 37 during the movement of said lever 28 to the left, to thrust said lever 37 to the left from the position shown, in which it is normally retained by the toggle spring 40 which is pivotally connected with the upper end of said lever 37 at 41 and pivotally connected with the adjustable abutment 42 which is in screw threaded engagement with the lug 43 in said casing 30; so that the pressure of said spring 40 may be varied. The purpose of said spring is to thrust said lever 37 with a snap action alternately to opposite limits of its range of movement, whenever said lever 37 is pushed past the dead center line extending between said pivots 38 and 42 in either direction. To permit the movement of said lever 37 to the right, independently of said latch 35, by the means hereinafter described, I provide the cone abutment 44 which has a screw threaded stem 45 axially adjustable thru the stationary lug 46 in said casing 30, and is so adjusted that it is encountered by the end of said latch 35 at the limit of the movement of the latter to the left to raise said shoulder 39 out of engagement with said lever 37.

Said lever 37 has the arm 48 overhanging the axially adjustable cap 49 on the stem 50 of said fuel gas controlling valve 12; so that movement of said levers 28 and 37 to the left to a sufficient extent opens said valve 12. The range of such movement of the lever 28 is limited by the stationary stop lug 51 in said casing 30 and the effect of such movement upon said valve 12 is, of course, permanently limited by the location of the shoulder 39 and variably limited by the adjustment of said valve stem cap 49 which is in screw threaded connection with the stem 50; so that the extent of opening of said valve 12 as a consequence of the expansion of the thermostat 1 is variably adjustable to determine the maximum flow of gas to the burner 9.

In order to permit the operation of said valve 12 with the minimum amount of resistance; I have avoided the use of any stuffing box for the valve stem 50 but prevent escape of gas from said casing 7 by providing said stem with the flexible resilient diaphragm 53 which is secured in said casing 7 by the screw cap 54, and normally holds said valve 12 shut as shown.

Said valve stem 50 is rendered axially adjustable thru said diaphragm 53, in accordance with the desired range of movement of said valve 12, by providing said stem with the screw thread 55 for engagement with the nuts 56 and 57 between which said diaphragm 53 may be clamped in the required axial position.

Said bell crank lever 37 has the screw stud 59 extending thru the slot 60 in the link 61 which is pivotally connected at 62 with the end of said slide valve 17. Such construction and arrangement permit the valve 12 to be opened while the valve 17 remains stationary; the extent of the differential movement of said valves being determined by the length of said slot 60.

The apparatus shown is so adjusted that the maximum temperature attained in the chamber 4 is 45° F.; and, while the valves 12 and 17 are in the position shown, with the gas supply to the burner 9 reduced to the minimum and the stream of cooling water flowing thru the conduit 21; the internal pressure of the refrigerant solution in said generator 10 falls to twenty pounds per square inch at a temperature of 70° F. During that period, the temperature in the chamber 4 gradually rises to 45° F., and, at the latter, the thermostat 1 operates to open the valve 12 as above described, and shut off the cooling water from the generator and turn on the cooling water to the condenser. Thereupon, the contents of said generator are gradually heated to 230° F., and a pressure of one hundred and sixty pounds per square inch. Thereupon, it is required to restore said valves 12 and 17 to the position shown, and such operation is effected by the thermostatic device including the sylphon bellows 64 which is connected by the conduit 65 with the bulb 66, containing thermostatic fluid, in the combustion chamber 11. Said thermostatic device 64 is adapted to then swing, to the right, the lever 67 which is fulcrumed at 68 in said casing 30, and has its range of movement limited by the stationary stop studs 70 and 71 in said casing. In order to adjustably determine the pressure and consequent temperature at which said sylphon 64 operates said lever 67, I oppose it by the spring 73 which continually tends to thrust said lever 67 to the left and is supported at its opposite end by the abutment 74 which is conveniently formed as a nut axially adjustable on the stationary screw stud 75.

Said lever 67 is connected by the pivot 77 at its lower end, with the plunger 78 which is mounted to reciprocate in said lug 46 in opposition to said lever 37, so that, at the temperature predetermined by the adjustment of said spring 73, as aforesaid, the internal pressure in said sylphon bellows 64 overcomes the pressure of said spring and thrusts said plunger 78 to the right, past the dead center line of the spring 40; so that the latter snaps said lever 37 to the position shown in the drawing, in which it is retained by said spring, until said lever is thrust in the opposite direction by the thermostat bellows 1, as above described.

As far as I am aware, it is novel and original with myself to provide a single thermostatic device, such as the bellows 1, which positively operates valve means for supplying fuel gas and cooling water to a refrigerating system. However, the specific construction and arrangement of the two-way valve in the casing 15 above described is the subject matter of my copending application (192–28) Serial No. 333,333, filed January 18, 1929, for Letters Patent of the United States, and it is to be understood that other suitable valve means may be employed.

Therefore, I do not desire to limit myself to the precise details of construction and arrangement herein set forth, as it is obvious that various modifications may be made therein without departing from the essential features of my invention, as defined in the appended claims.

I claim:

1. The combination with a thermostat; of a lever connected to be actuated by said thermostat; valves operative to respectively control different fluids in an apparatus; and means operatively connecting said valves with said lever; whereby said valves are operated in directions at right angles to each other; including a link having a slot connection with said lever; whereby said lever is movable to the extent of said slot connection, to operate the other valve before operating the valve having such slot connection.

2. The combination with a slide valve arranged to control a fluid; of a lever operatively connected with said valve by a link; a spring pivotally connected with said lever and with a support, whereby said spring effects a snap action of said lever in either direction past a center line between the fulcrum of said lever and the pivotal support of said spring, to alternately positively shift said valve to opposite limits of its range of movement; and another valve, arranged to be operated by said lever to control a different fluid.

3. In refrigerating apparatus, the combination with respective conduits for two different fluids; of respective valves, adapted to coordinately control the passage of said fluids thru said respective conduits; and means adapted to automatically coordinately operate said valves and effect the cyclic operation of said apparatus in accordance with the varying temperature of a thing being refrigerated; including a single lever, two thermostats adapted to positively shift said lever in respectively opposite directions, and connections from each of said valves to that lever, adapted to alternately open and close each of said valves, at variable intervals, when said thermostats reach respectively different predetermined temperatures for which they are calibrated with respect to different parts of said apparatus.

In testimony whereof, I have hereunto signed my name at Conshohocken, Pennsylvania, this 30th day of October, 1929.

JOSEPH WILLIAM WINTER.